(12) United States Patent
Bernhard et al.

(10) Patent No.: US 11,598,663 B2
(45) Date of Patent: Mar. 7, 2023

(54) TRANSDUCER FOR NON-INVASIVE MEASUREMENT

(71) Applicant: ABB Schweiz AG, Baden (CH)

(72) Inventors: Christof Bernhard, Aarau (CH); Frank Kassubek, Rheinfelden (DE); Miklos Lenner, Daettwil (CH); Detlef Pape, Nussbaumen (CH)

(73) Assignee: ABB Schweiz AG, Baden (CH)

( * ) Notice: Subject to any disclaimer, the term of this patent is extended or adjusted under 35 U.S.C. 154(b) by 9 days.

(21) Appl. No.: 17/189,287

(22) Filed: Mar. 2, 2021

(65) Prior Publication Data
US 2021/0181008 A1 Jun. 17, 2021

Related U.S. Application Data

(63) Continuation of application No. PCT/EP2019/073460, filed on Sep. 3, 2019.

(30) Foreign Application Priority Data

Sep. 6, 2018 (EP) .................................. 18192884

(51) Int. Cl.
G01F 23/296 (2022.01)
B06B 1/06 (2006.01)
G01F 23/2962 (2022.01)

(52) U.S. Cl.
CPC ........ *G01F 23/2968* (2013.01); *B06B 1/0644* (2013.01); *G01F 23/2962* (2013.01)

(58) Field of Classification Search
None
See application file for complete search history.

(56) References Cited

U.S. PATENT DOCUMENTS 3,512,400 A 5/1970 Lynnworth
4,692,654 A 9/1987 Umemura et al.
(Continued)

FOREIGN PATENT DOCUMENTS

DE 10221771 A1 11/2003
EP 0212470 A2 3/1987
(Continued)

OTHER PUBLICATIONS

P D. Wilcox et al.," Mode and Transducer Selection for Long Range Lamb Wave Inspection" Journal of Intelligent Material Systems and Structures, vol. 12, Aug. 2001, pp. 553-565, Sage Publications, New York, U.S.A.

*Primary Examiner* — Paul M. West
*Assistant Examiner* — Mark A Shabman
(74) *Attorney, Agent, or Firm* — Leydig, Voit & Mayer, Ltd.

(57) ABSTRACT

A transducer for non-invasive measurement includes: a shear-type piezoelectric element; and a host material. The shear-type piezoelectric element is mounted to a first face of the host material. A second face of the host material is mountable to a wall of a vessel that holds a liquid. When the second face of the host material is mounted to the wall of the vessel, the transducer when activated at an activation frequency launches a Lamb wave into the wall of the vessel. The transducer is designed such that a phase velocity of the Lamb wave in the wall of the vessel is greater than a speed of sound in the liquid held by the vessel.

11 Claims, 3 Drawing Sheets

(56) References Cited

U.S. PATENT DOCUMENTS

| | | | | |
|---|---|---|---|---|
| 4,735,097 A | * | 4/1988 | Lynnworth | G01N 29/069 |
| | | | | 73/290 V |
| 2010/0244629 A1 | * | 9/2010 | Nagashima | H01L 41/1134 |
| | | | | 310/339 |
| 2017/0010146 A1 | * | 1/2017 | Kassubek | G01S 15/88 |

FOREIGN PATENT DOCUMENTS

| | | |
|---|---|---|
| EP | 0264991 A1 | 4/1988 |
| EP | 3115753 A1 | 1/2017 |
| EP | 3115754 A1 | 1/2017 |
| GB | 738376 A | 10/1955 |
| GB | 855650 A | 12/1960 |
| GB | 959029 A | 5/1964 |
| WO | WO 2016134005 A1 | 8/2016 |

* cited by examiner

TRANSDUCER FOR NON-INVASIVE MEASUREMENT

CROSS-REFERENCE TO PRIOR APPLICATION

This application is a continuation of International Patent Application No. PCT/EP2019/073460, filed on Sep. 3, 2019, which claims priority to European Patent Application No. EP 18192884.7, filed on Sep. 6, 2018. The entire disclosure of both applications is hereby incorporated by reference herein.

FIELD

The present invention relates to a transducer for non-invasive measurement, and to a non-invasive measurement method.

BACKGROUND

Ultrasonic waves, generated by a transducer attached to a wall of a vessel have been used for the non-invasive measurement of parameters, such as level, speed of sound, mixing state etc., of a liquid contained within the vessel. The term "vessel" is used here and throughout this document in a broad sense, not being limited to a closed container, but also including containers that are at least partly open, and also including tubes or plumbing or pipelines that are configured to contain or guide any kind of media, such as liquids, liquified solids or gases of all kinds. The term "transducer" is used here and throughout this document to comprise both sender and receiver.

However, the radiation field launched into the liquid may not be as desired, leading to non-optimum measurements.

There is a need to address this issue.

SUMMARY

In an embodiment, the present invention provides a transducer for non-invasive measurement, comprising: a shear-type piezoelectric element; and a host material, wherein the shear-type piezoelectric element is mounted to a first face of the host material, wherein a second face of the host material is configured to be mounted to a wall of a vessel configured to hold a liquid, wherein when the second face of the host material is mounted to the wall of the vessel, the transducer when activated at an activation frequency is configured to launch a Lamb wave into the wall of the vessel, and wherein the transducer is configured such that a phase velocity of the Lamb wave in the wall of the vessel is greater than a speed of sound in the liquid held by the vessel.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
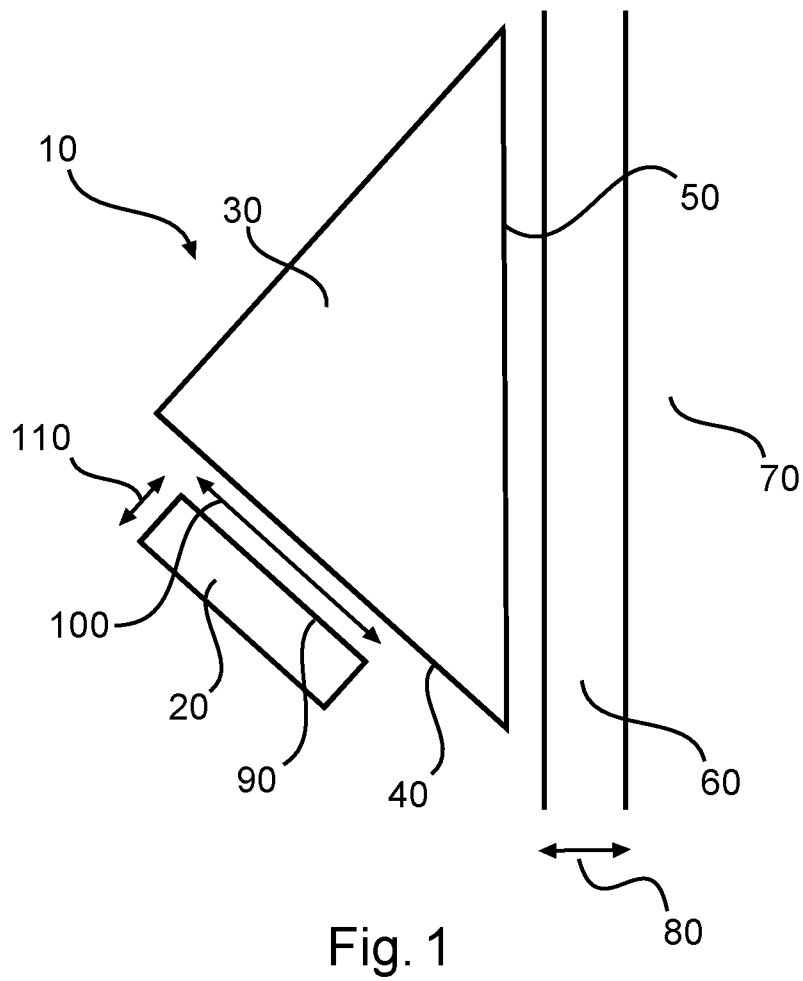
FIG. 1 shows a schematic representation of a transducer for non-invasive measurement.

In an embodiment, the present invention provides an improved transducer for non-invasive measurement and an improved non-invasive measurement method.

It should be noted that the following described aspects of the invention apply both for the transducer for non-invasive measurement and for the non-invasive measurement method.

In a first aspect, there is provided a transducer for non-invasive measurement, comprising:

a shear-type piezoelectric element; and
a host material.

The shear-type piezoelectric element is mounted to a first face of the host material. A second face of the host material is configured to be mounted to a wall of a vessel. The term "mounted to" is used here and throughout this document in a broad sense, comprising direct mounting, but also using some intermediate layer, for example that a silicon mat is used between host material and wall. The vessel is configured to hold a liquid. When the second face of the host material is mounted to the wall of the vessel, the transducer when operated as sender and activated at an activation frequency is configured to launch a Lamb wave into the wall of the vessel. The transducer is configured such that a phase velocity of the Lamb wave in the wall of the vessel is greater than the speed of sound in the liquid held by the vessel.

In this manner, effective excitation of ultrasonic waves for non-invasive measurement of parameters of a fluid stored in a container is provided, enabling for example the level, speed of sound measurement and other fluid parameters to be determined.

By requiring that the speed of sound in the liquid is smaller than the phase velocity of the Lamb wave, leaky Lamb waves can be generated or launched effectively into a liquid for non-invasive measurements The transducer can be configured to have a required phase velocity of Lamb wave, and a required radiation direction of the leaky Lamb wave in the liquid, because this depends on the ratio of the phase velocity to the speed of sound in the liquid. Thus, precise radiation direction is provided thereby enabling for accurate distance and speed of sound measurements in the liquid.

It is noted that the element specified with the term "transducer" can also be an element working as receiver. In such a case, an optimized transducer is also an optimal filter for incoming waves from a specific direction, such as plane waves.

In an example, the host material is polyamide.

By using a shear-type piezoelectric element—a non-standard piezoelectric—with an appropriate host material and an optimized transducer geometry a frequency steerable, well-defined, directional ultrasonic beam with an isolated cone can be generated in a liquid, which is beneficial for non-invasive measurement applications. Especially, the sound field can consist of—almost—plane waves propagating in a single direction.

In an example, the piezoelectric element is a single ceramic shear-type piezoelectric element. A shear-type piezoelectric element has the advantage that the aspect ratio does not need particular attention. In contrast to, for example, a plate-type piezo, which generates longitudinal and transversal waves and where thus the aspect ratio needs to be carefully controlled. This is not so in case of a shear-type piezo.

In an example, the transducer is configured such that the phase velocity of the Lamb wave in the wall of the vessel is greater than the speed of sound in the shear-type piezoelectric element.

In this manner, Lamb waves can be effectively generated.

In an example, the activation frequency is selected on the basis of a thickness of the wall of the vessel.

In an example, a face of the piezoelectric element is attached to the first face of the host material. A dimension of the face of the shear-type piezoelectric element is significantly greater than a thickness of the shear-type piezoelectric element perpendicular to the face of the shear-type piezoelectric element.

In an example, the thickness of the shear-type piezoelectric element is based at least in part on the activation frequency.

In an example, the dimension of the shear-type piezoelectric element is based at least in part on the activation frequency.

In an example, when the second face of the host material is mounted to the wall of the vessel, the transducer when activated is configured to launch a leaky Lamb wave into the liquid held by the vessel. A direction of propagation of the leaky Lamb wave is based at least in part on the thickness of the shear-type piezoelectric element.

In an example, when the second face of the host material is mounted to the wall of the vessel, the transducer when activated is configured to launch a leaky Lamb wave into the liquid held by the vessel. A direction of propagation of the leaky Lamb wave is based at least in part on the dimension of the face of the shear-type piezoelectric element.

In an example, the first face of the host material is angled to the second face of the host material.

Thus, the shape of the host material can be optimised to provide for increased efficiency of launching of leaky Lamb waves into the liquid.

In a second aspect, there is provided a non-invasive measurement method, comprising:

a) mounting a transducer to a vessel containing liquid, wherein the transducer comprises a shear-type piezoelectric element and a host material, wherein the shear-type piezoelectric element is mounted to a first face of a host material, and a second face of the host material is mounted to a wall of the vessel; and b) activating (220) the transducer at an activation frequency to launch a Lamb wave into the wall of the vessel; and wherein a phase velocity of the Lamb wave in the wall of the vessel is greater than the speed of sound in the liquid held by the vessel.

The above aspects and examples will become apparent from and be elucidated with reference to the embodiments described hereinafter.

FIG. 1 shows an example of a transducer 10 for non-invasive measurement. The transducer 10 comprises a shear-type piezoelectric element 20, and a host material 30. The shear-type piezoelectric element is mounted to a first face 40 of the host material. A second face 50 of the host material is configured to be mounted to a wall of a vessel 60. The vessel is configured to hold a liquid 70. When the second face of the host material is mounted to the wall of the vessel, the transducer when activated at an activation frequency is configured to launch a Lamb wave into the wall of the vessel. The transducer is configured such that a phase velocity of the Lamb wave in the wall of the vessel is greater than the speed of sound in the liquid held by the vessel.

According to an example, the host material is polyamide.

According to an example, the piezoelectric element is a single ceramic shear-type piezoelectric element.

According to an example, the transducer is configured such that the phase velocity of the Lamb wave in the wall of the vessel is greater than the speed of sound in the shear-type piezoelectric element.

According to an example, the activation frequency is selected on the basis of a thickness 80 of the wall of the vessel.

According to an example, a face 90 of the piezoelectric element is attached to the first face of the host material. A dimension 100 of the face of the shear-type piezoelectric element is significantly greater than a thickness 110 of the shear-type piezoelectric element perpendicular to the face of the shear-type piezoelectric element.

According to an example, the thickness of the shear-type piezoelectric element is based at least in part on the activation frequency.

According to an example, the dimension of the shear-type piezoelectric element is based at least in part on the activation frequency.

According to an example, when the second face of the host material is mounted to the wall of the vessel, the transducer when activated is configured to launch a leaky Lamb wave into the liquid held by the vessel. A direction of propagation of the leaky Lamb wave is based at least in part on the thickness of the shear-type piezoelectric element.

According to an example, when the second face of the host material is mounted to the wall of the vessel, the transducer when activated is configured to launch a leaky Lamb wave into the liquid held by the vessel. A direction of propagation of the leaky Lamb wave is based at least in part on the dimension of the face of the shear-type piezoelectric element.

According to an example, the first face of the host material is angled to the second face of the host material.

Figure 2:
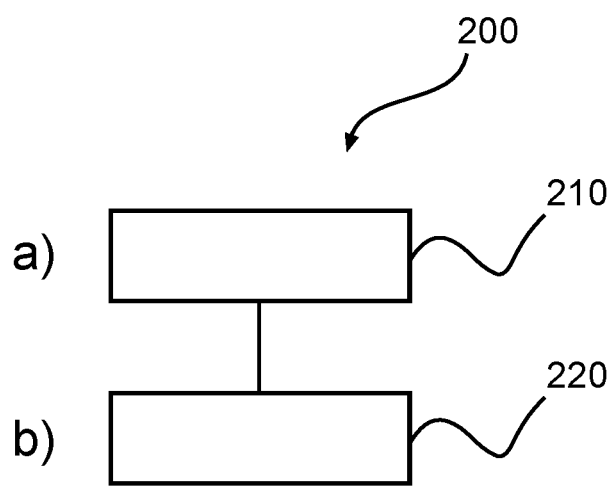
FIG. 2 shows a non-invasive measurement method.

FIG. 2 shows a non-invasive measurement method 200 in its basic steps. The method 200 comprises:

in a mounting step 210, also referred to as step a), mounting a transducer to a vessel containing liquid, wherein the transducer comprises a shear-type piezoelectric element and a host material, wherein the shear-type piezoelectric element is mounted to a first face of a host material, and a second face of the host material is mounted to a wall of the vessel; and in an activating step 220, also referred to as step b), activating the transducer at an activation frequency to launch a Lamb wave into the wall of the vessel; and wherein a phase velocity of the Lamb wave in the wall of the vessel is greater than the speed of sound in the liquid held by the vessel.

In an example, the host material is polyamide.

In an example, the piezoelectric element is a single ceramic shear-type piezoelectric element.

In an example, in step b) the phase velocity of the Lamb wave in the wall of the vessel is greater than the speed of sound in the shear-type piezoelectric element.

In an example, step b) comprises selecting the activation frequency on the basis of a thickness of the wall of the vessel.

In an example, in step a) a face of the piezoelectric element is attached to the first face of the host material. A dimension of the face of the shear-type piezoelectric element is significantly greater than a thickness of the shear-type piezoelectric element perpendicular to the face of the shear-type piezoelectric element.

In an example, the thickness of the shear-type piezoelectric element is based at least in part on the activation frequency.

In an example, the dimension of the shear-type piezoelectric element is based at least in part on the activation frequency.

In an example, step b) comprises launching a leaky Lamb wave into the liquid held by the vessel. A direction of propagation of the leaky Lamb wave is based at least in part on the thickness of the shear-type piezoelectric element.

In an example, the direction of propagation of the leaky Lamb wave is based at least in part on the dimension of the face of the shear-type piezoelectric element.

In an example, the first face of the host material is angled to the second face of the host material.

The transducer for non-invasive measurement and non-invasive measurement method are now described in more detail with reference to FIGS. 3-5.

Figure 3:
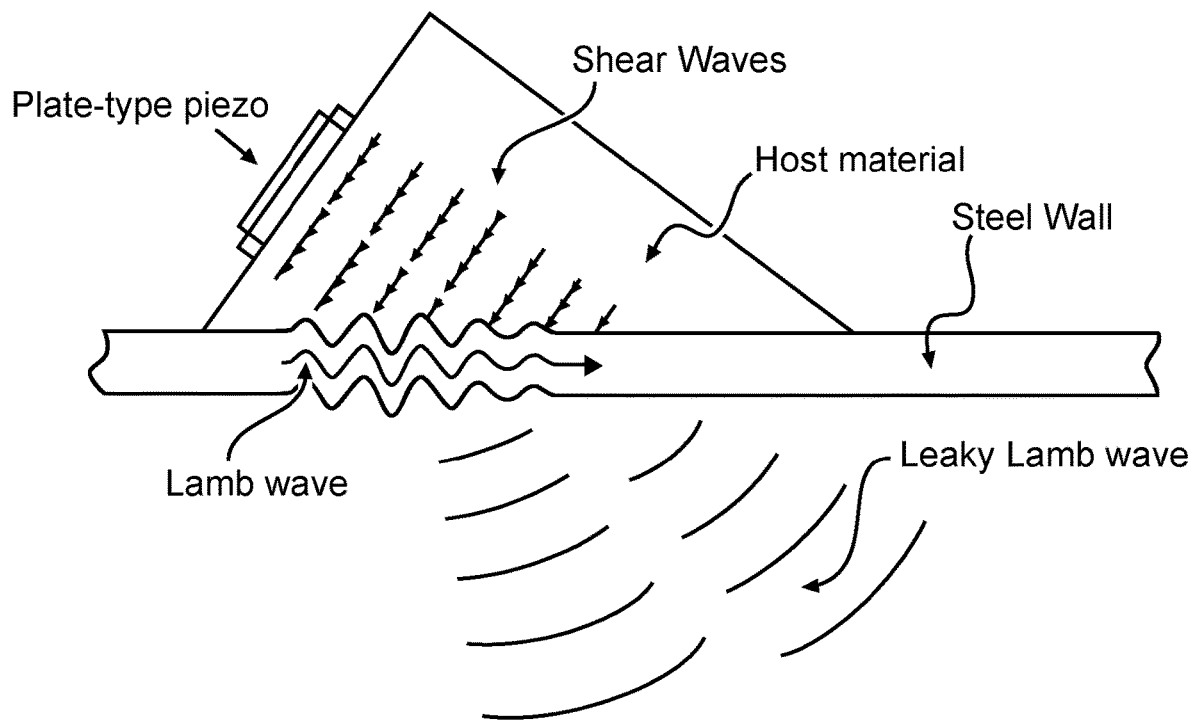
FIG. 3 shows a transducer with a plate-type piezoelectric element exciting disturbed leaky Lamb waves in a liquid.

FIG. 3 shows a transducer used for non-invasive measurement. A plate-type piezoelectric element is mounted, or attached, to a host or base material. The host material is mounted, or attached, to steel wall of a vessel containing a liquid. The plate-type piezoelectric element excites longitudinal (and to a smaller degree) transverse waves in the transducer material. The transverse modes have a special wave pattern; in the simplest case, two shear waves with opposite sign are emitted from the upper and lower half of the piezoelectric element. A complicated excitation pattern for Lamb waves in the vessel wall results. The leaky Lamb waves launched into the liquid has an undesired radiation field, with sound emitted in separate cones and in different directions.

Figure 4:
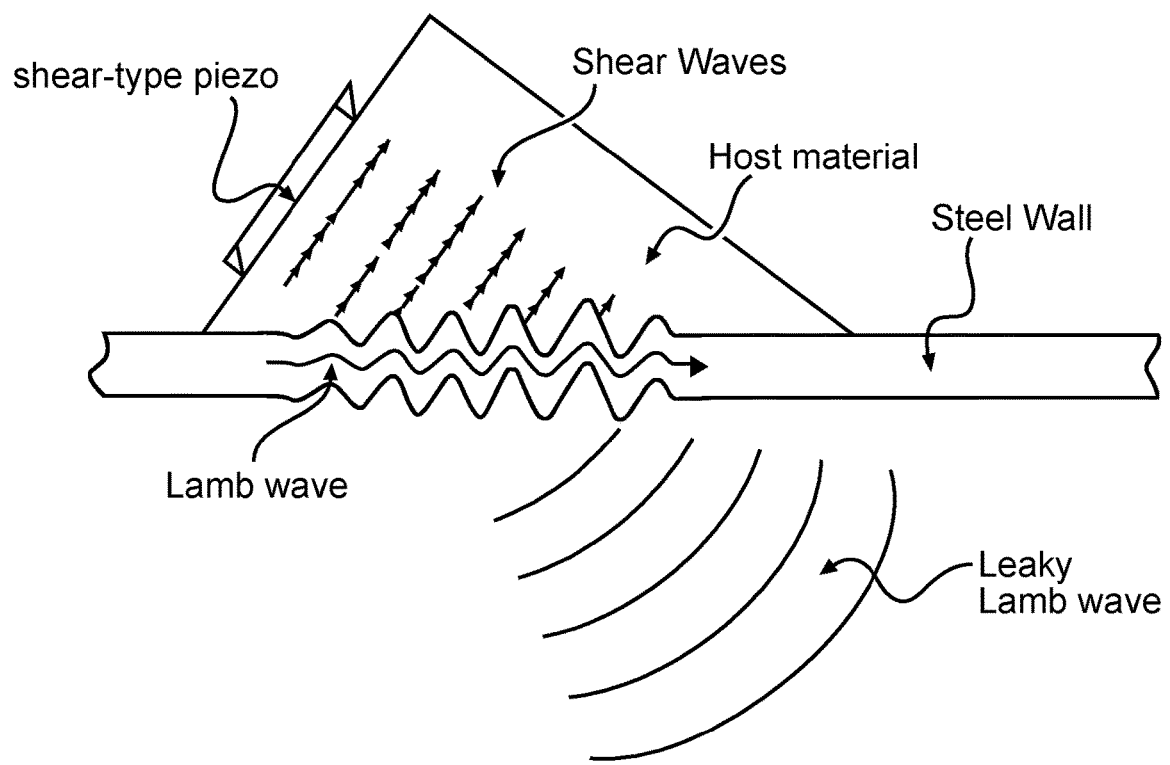
FIG. 4 shows an example of the transducer of FIG. 1, having a shear-type piezoelectric element exciting undisturbed leaky Lamb waves in a liquid.
Figure 5:
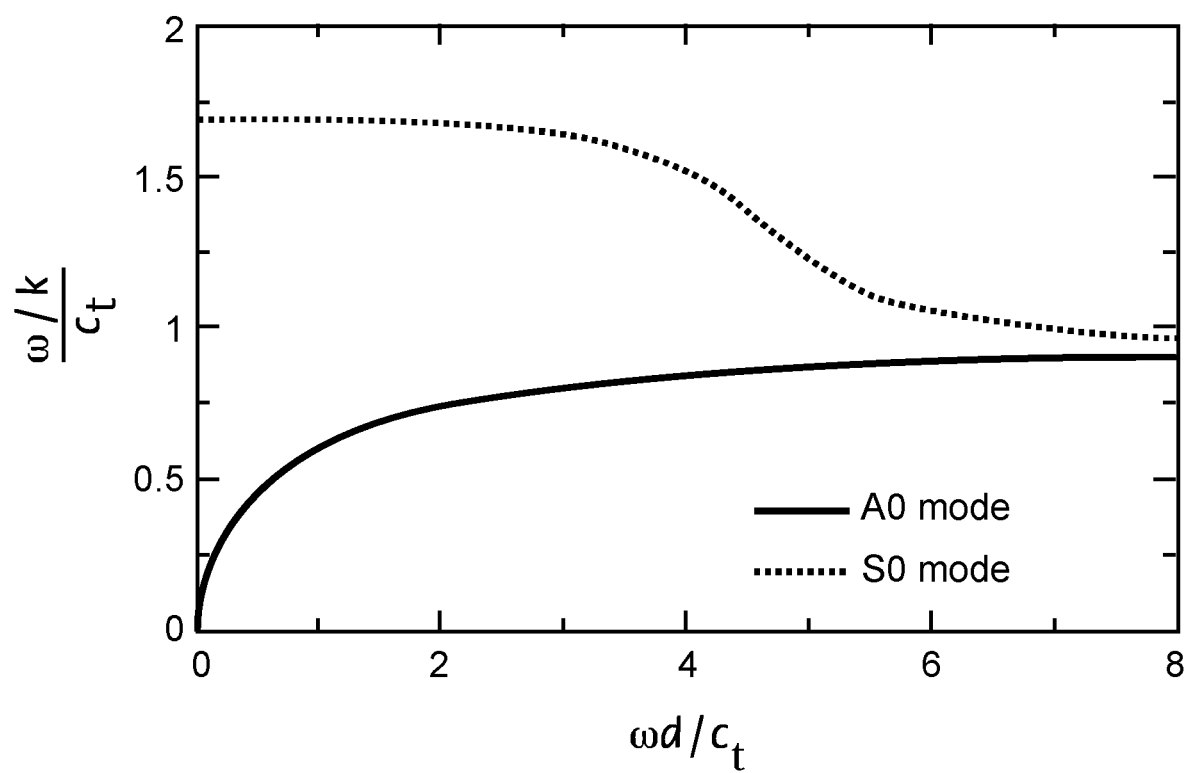
FIG. 5 shows the phase velocity of two Lamb wave modes (symmetric and asymmetric) as a function of frequency.

FIG. 4 shows the present solution, that addresses these issues. A shear-type piezoelectric element is mounted to a host material, which is itself mounted to the wall of a vessel containing a liquid. Thus, a shear-type piezoelectric actuator or element is mounted on a base (host) material to form an ultrasound transducer. The transducer is connected to a fluid-loaded plate (the vessel wall) in which asymmetric Lamb waves are excited. These waves emit energy in the form of pressure waves—leaky Lamb waves—into the liquid at a certain angle with respect to the plate normal. Directionality and steerability is provided, with beam control for a beam that has a single cone. This improves measurements for the non-invasive measurements of liquids, such as level, flow etc. In this manner a single shear-type piezoelectric transducer is used, reducing the cost and complexity of existing technologies that use ultrasonic transducer phase arrays composed of a multitude of individual piezo elements and require complex and costly driving electronic, or that use Y-cut quartz crystals that have issues relating to the available acoustic power available for certain applications. See A. McNab and M. J. Campbell, Ultrasonic phased arrays for nondestructive testing, NDT International, Volume 20, Issue 6, 1987, Pages 333-337, ISSN 0308-9126, GB738376(A), U.S. Pat. No. 4,692,654A, WO2016134005A1, EP0264991A1, and DE10221771A1.

Continuing with FIG. 4, the host material is polyamide, which has been selected due to its acoustic material properties. This ensures that the propagation speed of transverse pressure waves (shear waves) can be matched to the phase velocity of appropriate Lamb waves in the steel container wall. "Matching means that the projection of the wavelength of the incoming beam—in the transducer material—onto the wall matches the wavelength in the wall—of the Lamb wave. Control of the phase velocity of the lamb wave is enabled by frequency control of the excitation signal, as shown in FIG. 5. The operating frequency range is determined by the thickness of the plate (wall of the container), which in turn defines a selection of piezoelectric actuator with respect to dimension, type of material. The decoupling of transverse and longitudinal waves can be achieved by a) selective excitation of vibration modes or b) an appropriate choice of piezoelectric dimensions, where mode separation is achieved by using a single ceramic shear-type piezoelectric element of high aspect ratio. The appropriate selection of the piezoelectric thickness and aspect ratio enables direction control without introducing significant mode coupling between transversal and longitudinal vibrations. As shown in FIG. 4, the shear-type piezoelectric element emits unidirectional transversely oriented pressure waves into the host material. As a result, a unidirectional displacement of the piezoelectric element contact surface parallel to the interface with the host material is achieved and a shear wave therein is launched. Hence, the so-excited shear wave shows phase fronts with unidirectional displacement direction. This unidirectional displacement across the phase fronts enhances the effect of excitation of a single "phase matched" Lamb wave, propagating in one direction along the container wall resulting in an undisturbed leaky Lamb wave radiation pattern in the liquid. The piezoelectric element is mounted on a wedged host material, with a wedge angle optimised to provide efficiency of exciting leaky Lamb waves in the liquid and providing for maximum power transmission into liquid—see DE10221771A1.

It is noted that embodiments of the invention are described with reference to different subject matters. Transducer 30 may be made out of multiple materials and not a single solid block, for example a silicon mat attached. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A non-invasive fluid parameter measurement transducer, comprising:
   a shear-type piezoelectric element configured for non-invasive measurement of a plurality of fluid parameters; and
   a host material,
   wherein the shear-type piezoelectric element is mounted to a first face of the host material,
   wherein a second face of the host material is configured to be mounted to a wall of a vessel configured to hold a liquid,
   wherein when the second face of the host material is mounted to the wall of the vessel, the transducer when activated at an activation frequency is configured to launch a Lamb wave into the wall of the vessel and launch a leaky Lamb wave into the liquid,
   wherein the transducer is configured such that a phase velocity of the Lamb wave in the wall of the vessel is greater than a speed of sound in the liquid held by the vessel so as to excite ultrasonic waves for the non-invasive measurement of the plurality of fluid parameters,
   wherein the activation frequency is selected on a basis of a thickness of the wall of the vessel,
   wherein a face of the piezoelectric element is attached to the first face of the host material,
   wherein a dimension of the face of the shear-type piezoelectric element is greater than a thickness of the shear-type piezoelectric element perpendicular to the face of the shear-type piezoelectric element, and
   wherein a direction of propagation of the leaky Lamb wave is based at least in part on the thickness of the shear-type piezoelectric element.

2. The transducer according to claim 1, wherein the host material comprises polyamide.

3. The transducer according to claim 1, wherein the piezoelectric element comprises a single ceramic shear-type piezoelectric element.

4. The transducer according to claim 1, wherein the transducer is configured such that the phase velocity of the Lamb wave in the wall of the vessel is greater than the speed of sound in the shear-type piezoelectric element.

5. The transducer according to claim 1, wherein the transducer is configured such that the phase velocity of the Lamb wave in the wall of the vessel is greater than a speed of transverse waves in the host material.

6. The transducer according to claim 1, wherein the thickness of the shear-type piezoelectric element is based at least in part on the activation frequency.

7. The transducer according to claim 1, wherein a dimension of the shear-type piezoelectric element is based at least in part on the activation frequency.

8. The transducer according to claim 1, wherein a direction of propagation of the leaky Lamb wave is based at least in part on a dimension of the face of the shear-type piezoelectric element.

9. The transducer according to claim 1, wherein a change of the activation frequency leads to a change of the direction of propagation of the leaky Lamb wave so as to achieve an adaptable transducer.

10. The transducer according to claim 1, wherein the first face of the host material is angled to the second face of the host material.

11. A non-invasive fluid parameter measurement method, comprising:
   a) mounting a transducer to a vessel containing liquid, the transducer comprising a shear-type piezoelectric element configured for non-invasive measurement of a plurality of fluid parameters and a host material, the shear-type piezoelectric element being mounted to a first face of a host material, and a second face of the host material being mounted to a wall of the vessel; and
   b) activating the transducer at an activation frequency to launch a Lamb wave into the wall of the vessel and launch a leaky Lamb wave into the liquid, a phase velocity of the Lamb wave in the wall of the vessel being greater than the speed of sound in the liquid held by the vessel so as to excite ultrasonic waves for the non-invasive measurement of the plurality of fluid parameters,
   wherein the activation frequency is selected on a basis of a thickness of the wall of the vessel,
   wherein a face of the piezoelectric element is attached to the first face of the host material,
   wherein a dimension of the face of the shear-type piezoelectric element is greater than a thickness of the shear-type piezoelectric element perpendicular to the face of the shear-type piezoelectric element, and
   wherein a direction of propagation of the leaky Lamb wave is based at least in part on the thickness of the shear-type piezoelectric element.

* * * * *